United States Patent [19]
Andersen

[11] Patent Number: 5,378,374
[45] Date of Patent: Jan. 3, 1995

[54] LIME ADDITION SYSTEM FOR WATER TREATMENT

[76] Inventor: John N. Andersen, 55 Captain Carleton Rd., Cotuit, Mass. 02635

[21] Appl. No.: 136,235

[22] Filed: Oct. 15, 1993

[51] Int. Cl.$^6$ ............................................. C02F 1/66
[52] U.S. Cl. ................................. 210/743; 210/754; 210/756
[58] Field of Search ..................... 210/743, 754, 756

[56] References Cited

U.S. PATENT DOCUMENTS

| | | | |
|---|---|---|---|
| 1,685,300 | 9/1928 | Travers | 210/724 |
| 1,765,424 | 6/1930 | Hageman et al. | 210/724 |
| 3,551,332 | 6/1969 | Baumann et al. | 210/724 |
| 4,320,012 | 3/1982 | Palm et al. | 210/724 |
| 4,427,643 | 1/1984 | Fowler | 210/743 |
| 4,465,597 | 8/1984 | Herman et al. | 210/724 |
| 5,112,499 | 5/1992 | Murray et al. | 210/724 |

*Primary Examiner*—Neil McCarthy

[57] ABSTRACT

A system for the preparation of a lime slurry and metering of the slurry, which prevents scaling and plugging of equipment and piping. The elimination of scaling and ease of metering are achieved by a combination of process steps in an automated operating sequence. The system is particularly adaptable to the addition of lime to municipal water systems for reduction of the acidity of the water.

12 Claims, 1 Drawing Sheet

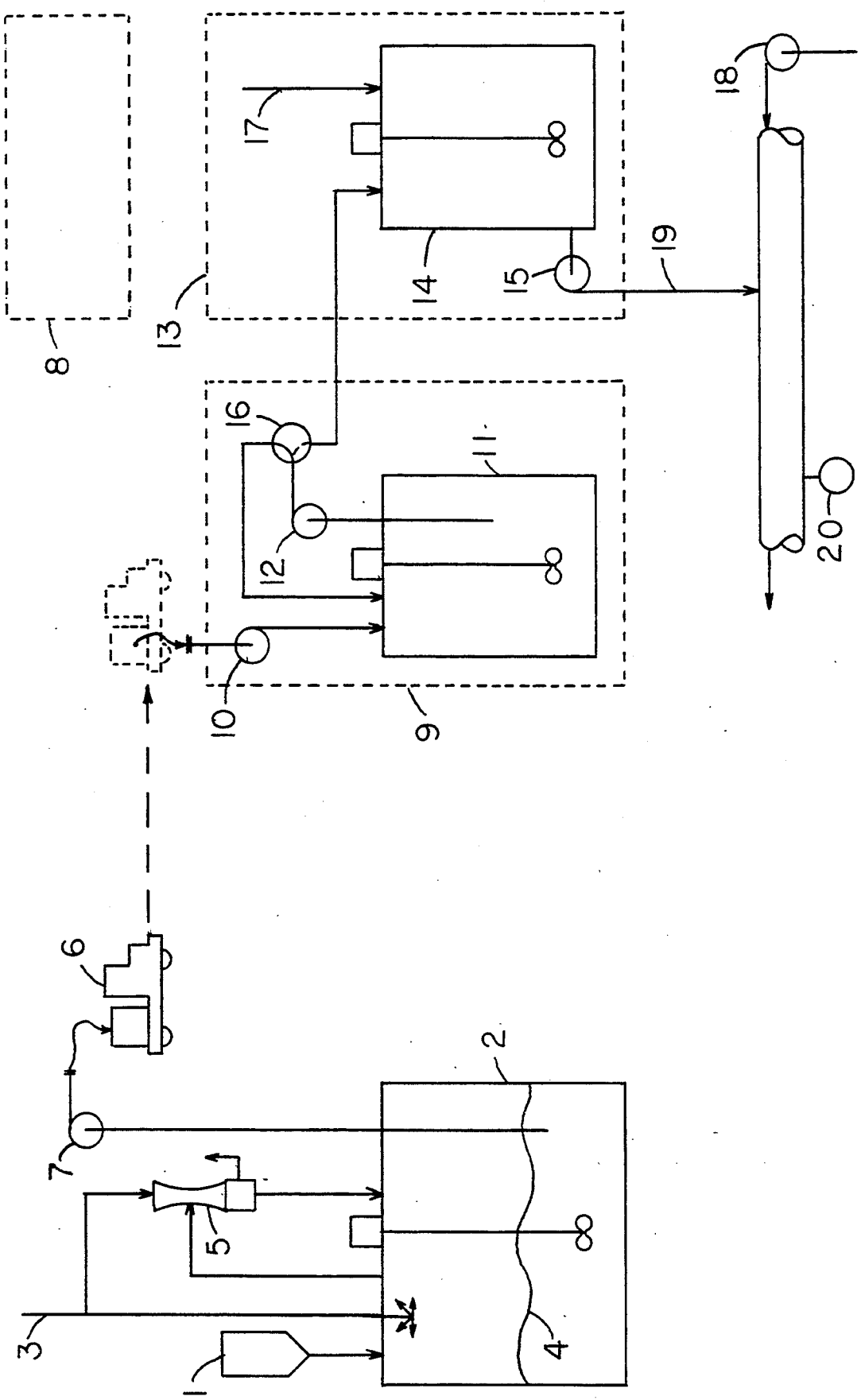

LIME ADDITION SYSTEM FOR WATER TREATMENT

BACKGROUND OF THE INVENTION

Lime is often used as the preferred reagent for neutralization of acidic compounds or in other chemical applications. However, lime reacts with sulfates, carbonates and bicarbonates to form insoluble compounds which result in scaling of equipment and piping. It has a low solubility making solution storage impractical and requiring either weigh feeding of powder or slurry storage and metering of slurry. It is a finely divided powder which is difficult to handle and creates excessive dusting.

It is known that when insoluble compounds are precipitated from solution they tend to crystallize on surrounding surfaces. Most compounds supersaturate and a finite time is required for precipitation to reduce the supersaturation. The phenomenon of precipitation on lime slurry particles has been referred to as lime stabilization. To date the potential of these effects has not been fully utilized. The invention provides am integrated process which is performed in a automated sequence in specialized equipment to mitigate the dusting problems, eliminate scaling and also provide for trouble free metering. It is best described with a comparison to the conventional lime addition systems employed in treating of municipal water supplies.

The U.S. Environmental Protection Agency (EPA) has established maximum lead and copper contaminant levels in the National Primary Drinking Water Regulations. These regulations are expected to reduce the exposure of approximately 130 million people to lead in drinking water. In 1% of the municipal water systems there is excessive lead or copper in the source water. In the remainder of the municipal water systems the source of the excessive lead or copper contamination is the result of chemical solution of lead and copper components of the piping systems. In order to meet the Maximum Contaminant Level Goals most of the municipal water systems will be required to install some sort of corrosion control treatment.

The copper and lead corrosion experienced in water systems is primarily caused by the acidity of the source water. This acidity results from mineral acids in acid rain and dissolved carbon dioxide which forms carbonic acid. Corrosion control can be accomplished by pH and alkalinity adjustment to reduce the acidity of the water, calcium adjustment to promote the formation of protective coatings inside pipes and plumbing or addition of a phosphate or silica-based corrosion inhibitor to form a protective coating inside of pipes and plumbing.

Of the corrosion treatment options the most widely practiced is reduction of the acidity with an alkali. The three alkalies commonly used are calcium hydroxide, potassium hydroxide and sodium hydroxide. Selection of the alkali to be used involves consideration of the effectiveness of the reagent in reducing corrosion of piping components, ease of control of pH, the capital and operating costs of a treatment facility, the effect on the taste of the water, the possible health effects resulting from the introduction of the reagent into the water and the safety in handling the reagent.

From a technical standpoint calcium hydroxide is the preferred reagent. In addition to reducing the acidity a protective coating is formed inside the piping system. Calcium neutralized waters have a greater buffering capacity, thereby providing a more stable pH and greater ease of control. Lime treated waters tend to taste better. Potassium hydroxide treatment tends to impart a bitter taste to the water. Sodium hydroxide treatment has the disadvantage of raising the sodium content of the water making it a health concern for certain individuals and is often dropped from consideration for this reason. Of the three reagents calcium hydroxide is the least hazardous to handle. Addition of lime does increase the hardness of the water, but since acid waters generally are low in hardness the effect of this increase is negligible.

A financial comparison of acid water treatment costs given in Table 1 shows substantially less reagent cost for lime or calcium hydroxides. The difficulties in handling calcium hydroxide in the conventional systems increases the capital costs and the operating and maintenance costs to the extent that overall calcium hydroxide treatment is the most costly. While lime treatment is the preferred process many water suppliers are going to the use of other reagents because of the operating difficulties and high maintenance costs associated with lithe use in conventional systems.

Conventional lime treating facilities usually consist of a covered storage area used for storing, for example, fifty pound bags of hydrated lime, a feed hopper into which the hydrated lime is manually transferred, a weigh feeder volumetric feeder which meters the hydrated lime into a dissolving tank and a pump for injecting the lime solution into the water main. The systems are designed to operate unattended. In large installations quick lime may be used instead of hydrated lime but this requires the addition of slaking equipment and continuous on site supervision.

Handling the finely divided lime powder creates a severe dust problem and generally necessitates a separate building for the process equipment. Filling the feed hopper and metering the powder into the dissolving system are dusty and labor intensive operations. The feed hopper and feeder are subject to frequent plugging. Scale formation in the dissolving tank and associated piping is a continuing occurrence causing line plugging and injection pump malfunction. These problems result in excessive operating and maintenance costs. In municipal water systems having multiple, widely separated well sites requiring on site treatment the addition of lime requires substantially more capital for buildings and the maintenance and operating problems are increased. The operating and maintenance problems affect the reliability of these systems to the extent that State regulatory agencies are reluctant to issue permits for new calcium hydroxide treatment systems.

Use of the present invention eliminates all of the aforementioned disadvantages of lime handling and results in being the most economic means of water neutralization.

TABLE

FINANCIAL COMPARISON OF pH TREATMENT SYSTEMS FOR A 272,000,000 GALLON PER YEAR MUNICIPAL WATER SYSTEM SUPPLIED BY FIVE WIDELY SEPARATED WATER WELLS.

|  | CONVENTIONAL TREATMENT SYSTEMS | | | IMPROVED SYSTEM |
| --- | --- | --- | --- | --- |
|  | Calcium Hydroxide | Potassium Hydroxide | Sodium Hydroxide | Calcium Hydroxide |
| Reagent Cost | 3,000 | 19,800 | 11,600 | 3,000 |
| Operating | 25,500 | 5,000 | 5,000 | 5,000 |

TABLE-continued

FINANCIAL COMPARISON OF pH TREATMENT
SYSTEMS FOR A 272,000,000 GALLON PER YEAR
MUNICIPAL WATER SYSTEM SUPPLIED BY
FIVE WIDELY SEPARATED WATER WELLS.

|  | CONVENTIONAL TREATMENT SYSTEMS | | | IMPROVED SYSTEM |
| --- | --- | --- | --- | --- |
|  | Calcium Hydroxide | Potassium Hydroxide | Sodium Hydroxide | Calcium Hydroxide |
| and Maintenance Labor | | | | |
| Debt Service on Capital Facility (8% for 15 Years) | 125,100 | 112,200 | 112,200 | 48,800 |
| Total Annual Operating Costs | $153,600 | $137,000 | $128,800 | $56,800 |

BRIEF DESCRIPTION OF THE FIGURE

The figure shows graphically a lime slurry preparation tank and means for transporting the slurry to a stock tank at one of several water well locations. Slurry from the stock tank is diluted and injected, under controlled conditions, into the water supply main.

SUMMARY OF THE INVENTION

The lime treating system of the invention is an integrated neutralization facility using lime as the neutralizing agent, which while it may have other applications, is particularly adapted to water systems having multiple widely separated water wells. For adjusting the pH in a municipal water system with multiple wells, the system consists of a central mix location, truck transport of slurry to each well location and equipment modules at each of the well stations for preparation and injection of dilute lime slurry into the water mains. The entire system is highly automated and runs without operator supervision. The invention comprises the unique combination of operational steps and equipment to overcome the shortcomings of the conventional lime treating systems.

The dust problem at the stations has been completely eliminated by delivery of the lime as a slurry. The process equipment required at each station consists of two small tanks, three pumps and a control panel. Elimination of the dust problem and the need for bag storage and solids feeding equipment permits the installation of all of the process equipment in existing pumping stations.

The central mix location provides for storage of lime in large containers, such as "Super Sacks" and also for the dust free preparation of the slurry.

DESCRIPTION OF THE INVENTION

The invention as practiced in municipal water systems is described with reference to the figure.

Super Sacks, containing about 1500 pounds of hydrated lime each, are received at the central mix location which serves as a lime storage facility and a slurry preparation area. To prepare a batch, Super Sack 1 is emptied into agitated mix tank 2 and sufficient water 3 is added to prepare an 18% slurry. The lime and water are added, with agitation, to a heel of at least 800 gallons of 18% slurry 4 remaining in the tank from the previous batch. During the solids addition a heavy spray of incoming water continuously washes dust particles from the tank roof and walls. A portion of the incoming water is diverted to a venturi scrubber 5 mounted on the tank vent to maintain a slight negative pressure within the mix tank. After addition of the hydrate and water has been completed the slurry is agitated for thirty minutes.

Loads of the 18% slurry are transferred, for example by truck, 6 to each of the water well locations. The slurry is pumped to the truck by a diaphragm pump 7. The pump and lines are mounted above the tank and provision is made to drain and flush the pump and lines back into the tank. The entire transfer is automated.

Each of the well pump stations is equipped with three equipment modules. The modules are designed to be located independently in the pump stations and then interconnected. This design permits making the installation in the tight confines of existing pump stations and eliminates the need for costly structural additions. A single wall mounted control module 8 services the other two modules. The second module 9 consists of a diaphragm pump 10 to receive truck shipments of slurry, an agitated slurry stock 11 tank and a positive displacement slurry pump 12 for slurry recirculation and metering. The third module 13 consists of an agitated injection tank 14 containing 2% lime slurry and a lime injection pump 15 to meter and inject the dilute slurry into the water main.

The entire operation at each of the stations is automated. The unit is completely shut down when the water well is not operating. When a signal is received to start water well operation both tank agitators are started. After the contents of both tanks are thoroughly mixed, the water well pump is turned on, the lime injection pump begins injecting the 2% lime slurry into the water main at a constant preset rate and the positive displacement slurry pump begins recirculating the 18% lime slurry at a rate which achieves the optimum line velocity for slurry pumping. Two minutes after circulation of the 18% slurry has been established the 2% slurry make up controls are activated.

When the level of the injection tank drops below a preset value a level sensor begins the makeup cycle. During makeup the speed of the positive displacement lime slurry pump is temporarily adjusted for optimum metering precision and the three-way valve 16 diverts flow of 18% slurry to the injection tank for a preset time interval. Simultaneously a timed flow of treated water 17 is delivered to the injection tank to maintain the desired concentration.

Control of the system is based on an essentially constant flow and acidity of the well water 18 and on an essentially constant volumetric output 19 of the slurry injection pump. The concentration of the slurry in the injection tank is maintained in a range which provides sufficient precipitation nuclei and yet is dilute enough to be easily metered into the water main. The concentration range is predetermined by manual adjustment of the injection pump output which remains constant after the initial adjustment, A pH sensor 20 located in the water main downstream of the injection point is equipped with two relays. When the pH exceeds the set value, the 18% slurry is diverted to the injection tank for a preset shorter time interval during the next makeup cycle. Since each makeup batch is only a fraction of the tank's contents the changes in slurry concentration and the resultant pH correction are minor. All of the controls are simple relays and timers and require no calibration. The only operator attention is a once a day check, during which he may adjust the water input timer to maintain uniform cycling above and below the pH set point.

When the water well is turned off the agitators and the positive displacement slurry pump are turned off. The lime injection pump is flushed for three minutes prior to shutdown.

If it is necessary to adjust the pH of the water supply and also to chlorinate it, both of these operations can be carried out simultaneously by the addition of a chlorinating agent to the 18% slurry. The output from a water well has an essentially constant flow and the ratio of the lime requirements for pH adjustment to the chlorine demand will be essentially constant, varying only over an extended period of time. The hydrated lime and chlorinating agent are admixed in the ratio of their requirements. If the ratio of the lime and chlorinating agents is the same for all of the wells the chlorinating agent can be added during the preparation of the 18% slurry in the mix tank. If the ratio varies from well to well the chlorinating agent can be added to the truck shipments.

EXAMPLE

A lime neutralization system was installed for a municipal water supply consisting of five widely separated water wells providing 272,000,000 gallons of water per year. On average once every 15 days an 18% lime slurry batch was prepared at a central mix station in a tank containing a heel of at least 800 gallons of 18% lime slurry from the previous batch. Water at the rate of 25 gallons per minute was directed into four spray nozzles and a venturi scrubber on the tank vent. The spray nozzles washed down the exposed surfaces of the tank and provided a curtain of water droplets to wet the incoming lime hydrate. The venturi scrubber provides a negative tank pressure and vent gas scrubbing to eliminate dust release. After water flow was started the contents of a 1500 pound Super Sack of hydrated lime was emptied into the tank. When 890 gallons of water were added the water flow was automatically shut off and the tank contents were agitated for an additional 30 minutes.

On average once every four days a 200 gallon load of the 18% slurry was transferred to a stock tank in one of the pump stations.

At a given station when a signal was received to operate the water well the agitators on the stock tank and the injection tank water were turned on. After four minutes of agitation a progressive cavity pump mounted on top of the stock tank began recirculating 18% slurry from the stock tank at a flow rate of two gallons per minute, the water well began pumping at 500 gallons per minute and injection of dilute lime slurry at 0.75 gallons per minute commenced. Two minutes later the makeup controls were activated.

When the level of the injection tank dropped to 90% of the operating level the speed of the progressive cavity pump was temporarily reduced to provide a flow rate of one gallon per minute. The three-way valve diverted the recirculating flow to the injection tank for 40 seconds and simultaneously water was added to the injection tank for 75 seconds. This action restored the operating level and maintained the desired lime slurry concentration of about 2%.

The set point for the pH of the treated water was set at 7.0. When the pH exceeded 7.0 a relay reset the time period for the next transfer of 18% slurry to 20 seconds. Reducing the amount of slurry transferred lowered the pH back to the set point. A control range of + or −0.2 of a pH unit was achieved. Initial manual adjustment of the injection pump rate established the dilute slurry concentration and once set this adjustment was not changed. Over time any slight tendency for the pH to drift from the operating range was corrected by increasing or decreasing the water addition by one or two seconds.

When the water well was shut down both agitators and the progressive cavity pump were turned off. Residual slurry in the pump and recirculation loop drained back into the stock tank. The injection pump was flushed with water for three minutes before shut down.

The prototype unit operated for an extended period with no maintenance required. At the end of the period all lines were clear and there was no scale forming on the tank walls.

As shown in the above example, the basis of the invention is the unique combination of equipment, operating parameters and controls that have eliminated the scaling and plugging problems associated with the conventional lime addition systems. The 18% slurry in the mix tank contains highly active crystalline nuclei precipitated during the preparation of the slurry. In the makeup of subsequent batches of 18% slurry starting with a heel from the previous batch assures that at all times there are sufficient active crystalline nuclei in suspension to act as precipitation sites to avoid the formation of scale on the tank walls and other surfaces in contact with the slurry. Washing of the tank roof and walls during batch preparation avoids dust collection above the slurry level which may initiate future scaling at these sites. Agitation for thirty minutes after batch preparation assumes adequate dispersion of the active nuclei until all supersaturation has been eliminated and avoids scaling of lines and equipment downstream of the tank.

Plugging of the 18% slurry transfer lines is eliminated by assuring that the slurry is uniformly dispersed before pumping, by avoiding flow throttling, maintaining high flow rates and automatically draining or flushing lines and equipment on shutdown. In the automated start-up sequence at the well stations the slurry is uniformly dispersed prior to operation of the pumps. The 18% slurry metering loop has a positive displacement pump which has no dead pockets to accumulate solids. The pump is operated by a DC motor at a speed which provides the optimum velocity for slurry transport in the recirculation mode. In the transfer mode the pump speed is reduced to lengthen the transfer time for optimum metering precision. The transitions between the recirculation and transfer modes are accomplished without throttling by use of a three-way valve. The pump is mounted above the stock tank and the dead portions of lines created by the valve switching automatically drain to the tanks. On shutdown all of the lines in the transfer loop drain to the tanks.

Scaling of the injection tank, injection pump and injection line is avoided by adjusting the injection pump rate to provide a high enough velocity for ease of metering and transport, and at the same time maintain a high enough concentration of active nuclei for precipitation within the slurry. Addition of the 18% slurry and dilution water at frequent intervals and the almost instantaneous mixing with a substantially larger volume reduces the magnitude of supersaturation. There is adequate time between addition cycles for reduction of the supersaturation to a harmless level. On shutdown the injection pump and the suction and discharge lines are flushed with water.

Dust problems at the well stations were completely eliminated by having no dry hydrate solids present. Dust release at the central mix location was eliminated by having the Super Sack connected firmly to the tank prior to emptying of the contents of the sack and maintaining a negative pressure with a venturi scrubber on the tank vent line.

A prototype unit operating on a 400 gallon per minute water well was operated for an extended period with no maintenance being required. At the end of the period the was flow scale buildup on the tank walls and in the piping system. The progressive cavity pump and the lime injection pumps required no servicing during the entire period.

What is claimed is:

1. A process for the control of the acidity of municipal water supplies which comprises:
   (a) introducing into a first agitated vessel, which contains a lime slurry heel, a mixture of hydrated lime and water in an amount sufficient to obtain a slurry having a lime concentration from about 12 to about 24% by weight;
   (b) transferring the slurry from the first vessel into a second agitated holding vessel containing a lime slurry heel and circulating the slurry in the second vessel;
   (c) providing a third agitated vessel containing a dilute lime slurry having a concentration from about 1 to 4% by weight;
   (d) continuously feeding the dilute slurry to the municipal water supply at a rate sufficient to obtain a substantially neutral pH while periodically restoring the dilute lime slurry level in the third agitated vessel by addition of a controlled quantity of slurry from the second agitated vessel and water to maintain the desired slurry concentration and also a slurry level which is not less than about 75% of the vessel capacity.

2. A process according to claim 1, wherein the pH of the lime slurry-adjusted municipal water supply is continuously monitored by electronic means and signals generated by upward deviations from a set point pH value are utilized for temporary downward adjustment of the flow of slurry introduced from the second agitated vessel to the third agitated vessel until the desired pH value is restored in the water supply.

3. A process according to claim 1, wherein the slurry from the second agitated vessel is transferred to the third agitated vessel by means of a positive displacement pump.

4. A process according to claim 1, wherein the slurry from the second agitated vessel is transferred to the third agitated vessel by means of a progressive cavity pump.

5. A process according to claim 1, wherein a measured quantity of a chlorinating agent is introduced into the first vessel along with the measured amounts of hydrated lime and water.

6. A process according to claim 5, wherein the chlorinating agent is calcium hypochlorite.

7. A process according to claim 5, where in the chlorinating agent is sodium hypochlorite.

8. A process according to claim 5, wherein the chlorinating agent is chlorine.

9. A process according to claim 1, wherein a measured quantity of a chlorinating agent is introduced into the slurry being transferred from the first vessel into the second agitated vessel.

10. A process according to claim 9, wherein the chlorinating agent is calcium hypochlorite.

11. A process according to claim 9, wherein the chlorinating agent is sodium hypochlorite.

12. A process according to claim 9, wherein the chlorinating agent is chlorine.

* * * * *

UNITED STATES PATENT AND TRADEMARK OFFICE
CERTIFICATE OF CORRECTION

PATENT NO. : 5,378,374
DATED : January 3, 1995
INVENTOR(S) : John N. Andersen

It is certified that error appears in the above-indentified patent and that said Letters Patent is hereby corrected as shown below:

Column 1, lien 23, change "provides am inte-" to —provides an inte—.
Column 2, line 15, change "hydorxides" to —hydroxide—.
Column 2, line 23, change "lithe" to —lime—.
Column 2, line 28, change "feeder volumetric" to —feeder or volumetric—.
Column 6, line 35, change "ssumes" to —assures—.
Column 7, line 14, change "period the was flow scale" to —period there was no scale—.

Signed and Sealed this

Twenty-third Day of May, 1995

Attest:

BRUCE LEHMAN

Attesting Officer     Commissioner of Patents and Trademarks